(12) United States Patent
Galmes et al.

(10) Patent No.: US 10,348,929 B2
(45) Date of Patent: Jul. 9, 2019

(54) PRINT FRAMES CREATION

(71) Applicant: Hewlett-Packard Development Company, L.P., Houston, TX (US)

(72) Inventors: Jose Galmes, San Diego, CA (US); Lluis Abello Rosello, Tarragona (ES); Joan Vidal Fortia, Barcelona (ES); Frank E. Perdicaro, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/569,345

(22) PCT Filed: Jul. 28, 2015

(86) PCT No.: PCT/US2015/042472
§ 371 (c)(1),
(2) Date: Oct. 25, 2017

(87) PCT Pub. No.: WO2017/019040
PCT Pub. Date: Feb. 2, 2017

(65) Prior Publication Data
US 2018/0069982 A1    Mar. 8, 2018

(51) Int. Cl.
*H04N 1/387* (2006.01)
*G06F 3/12* (2006.01)
*G06K 15/02* (2006.01)

(52) U.S. Cl.
CPC ......... *H04N 1/3875* (2013.01); *G06F 3/1219* (2013.01); *G06F 3/1251* (2013.01);
(Continued)

(58) Field of Classification Search
None
See application file for complete search history.

(56) References Cited

U.S. PATENT DOCUMENTS 8,345,307 B2    1/2013  Saquib et al.
8,356,809 B2    1/2013  Dawley et al.
(Continued)

FOREIGN PATENT DOCUMENTS

| EP | 1707386 | 10/2006 |
|---|---|---|
| WO | WO-2008097465 | 8/2008 |
| WO | WO-2013144437 | 10/2013 |

OTHER PUBLICATIONS

HP High-speed Inkjet Corrugated Packaging Solution, Jul. 2014. Available online at: http://h20195.www2.hp.com/v2/getpdf.aspx/4aa5-3200enw.pdf.

*Primary Examiner* — Andrew H Lam
(74) *Attorney, Agent, or Firm* — HP Inc. Patent Department

(57) ABSTRACT

An example system includes a controller. The controller is to determine a first end point of a previous frame in a first image. The first image is to be printed on a first ribbon. The controller is to determine a second end point of the previous frame in a second image to be printed on a second ribbon. The controller is to create a current frame containing first image data from the first image starting after the first end point, second image data from the second image starting after the second end point, and third image data from a beginning of the first image. The system includes an image engine to form an image corresponding to the current frame on a medium.

5 Claims, 6 Drawing Sheets

(52) U.S. Cl.
CPC ....... *G06F 3/1282* (2013.01); *G06K 15/1848*
(2013.01); *Y02D 10/1592* (2018.01)

(56) References Cited

U.S. PATENT DOCUMENTS

| | | |
|---|---|---|
| 8,402,805 B2 | 3/2013 | Leon et al. |
| 8,528,890 B2 | 9/2013 | Graushar et al. |
| 2008/0043255 A1* | 2/2008 | Wada ................. H04N 1/00132 358/1.2 |
| 2009/0060610 A1 | 3/2009 | Matsuhashi |
| 2009/0231610 A1 | 9/2009 | Frank |
| 2009/0282996 A1 | 11/2009 | Schuler-Cossette et al. |
| 2010/0209167 A1 | 8/2010 | Shuya |
| 2014/0268185 A1 | 9/2014 | Gopalakrishnan et al. |

\* cited by examiner

PRINT FRAMES CREATION

BACKGROUND

A web press may print large numbers of images onto a medium (i.e., a web), such as paper, cardboard, or the like. The medium may be significantly longer than the images to be printed, and the medium may later be cut to form individual units with the images printed on them. The medium may be cut after image formation to create individual sheets, boxes, etc. The web press may allow large numbers of units to be printed quickly. In one example, the web press may include cylinders to form the images on the medium. Alternatively, the web press may include inkjet printheads to form the images on the medium.

DETAILED DESCRIPTION

To save costs, a web press operator may try to waste as little of the medium as possible. The web press operator may put as many images as possible across the web to minimize the residual medium. As used herein, the term "across" web refers to the direction perpendicular (on the surface of the web) to the direction the web moves through the web press. The web press operator may efficiently minimize the residual medium by printing a plurality of images having different widths (e.g., by stacking the images across the web). As used herein, the term image "width" refers to the dimension of the image parallel to the direction across the web. The web press operator can vary the number of each type of image until the residual medium is minimized. The images may be repeated along the web. As used herein, the term "along" the web refers to the direction perpendicular to the across web direction. As used herein, a "ribbon" is an elongated strip on a medium to receive a set of images repeated end-to-end along the elongated dimension. For example, a ribbon may be a portion of a web to receive a set of images repeated lengthwise along the web. Each ribbon has a width of one image.

Unfortunately, the lengths of the different types of images may vary, so the images may be aligned on only one side. As used herein, the term image "length" refers to the dimension of the image perpendicular to the image width (on the surface of the web). Then, the next set of images will not be aligned. Indeed, numerous additional images may need to be printed before the images become aligned again. For example, a web that includes a 53-inch wide image and a 37-inch wide images will only have the images align once every 1,961 inches (163.4 feet), which is the least common multiple of the two lengths. The situation may be worse for images of other sizes or if more than two images are included. A web press may not be able to print such a pattern. A web press with cylinders would need the cylinders to have a circumference of 1,961 inches to print 53-inch and 37-inch images together. A web press with inkjet cylinders would need a significant amount of memory to store all the data needed to print a pattern that only repeats once every 1,961 inches.

One solution is to cut the medium into individual units and then print the images onto each individual unit. However, this takes the extra time and labor to feed each individual unit into a printer after cutting. Alternatively, extra gaps can be included between the images so that they align more often. However, the gaps result in additional wasted residual material. Accordingly, there is a need for a system that can print differently sized images onto a web prior to cutting and without extra gaps.

Figure 1:
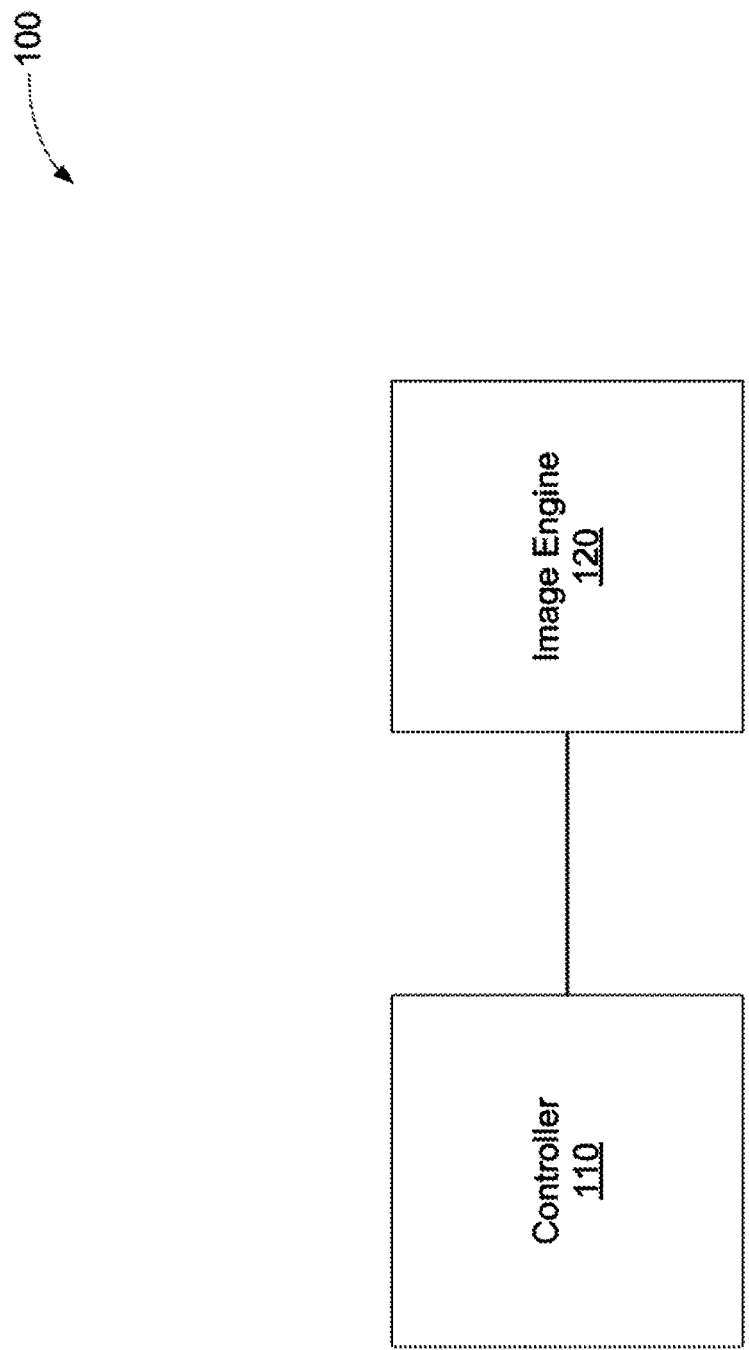
FIG. 1 is a block diagram of an example system to form a plurality of images on a medium.

FIG. 1 is a block diagram of an example system 100 to form a plurality of images on a medium. The system 100 may include a controller 110. As used herein, the terms "controller" and "engine" refer to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware.

The system 100 may print a frame on the medium. As used herein, the term "frame" refers to a set of computer-readable data to be printed that has a predetermined width and a predetermined length or refers to locations in a computer-readable medium to receive such data (i.e., an empty frame). The predetermined width may be a width of a ribbon, a sum of the widths of all ribbons, an arbitrary value, or the like. The predetermined length may be a length of the first or second images, a default length, a user-specified length, an arbitrary length, or the like. The length may be less or significantly less than the least common multiple of the length of the first image and the length of the second image.

The controller 110 may create the frame from image data in the first and second images, which are to be printed on first and second ribbons. The controller 110 may determine a first end point of a previous frame in the first image. As used herein, the term "end point" refers to the last portion of the image that was included in the previous frame. In some examples, the end point may be specified as a single number, such as the last column printed (i.e., a column running along the width of the image). If the first image is being printed from left to right, the end point may be the right most column that was included in the previous frame. As used herein, the term "left" refers to the direction along the web that points towards the images printed earliest in time and "right" refers to the opposite direction. If there is no previous frame, the end point may be the column immediately before the start of the first image. The controller 110 may also determine a second end point of the previous frame in the second image. Determining the first or second end points may include storing an indication of the end point, storing an indication of a next start point, or the like. As used herein, the term "start point" refers to the first portion of the image that is to be included in a current frame (e.g., a first column).

The controller 110 may create the current frame by including first image data from the first image. For example, the controller 110 may copy the first image data from the first image until the controller 110 reaches the end of the current frame or the controller 110 reaches the end of the first image (e.g., the right most column). The controller 110 may also copy second image data from the second image until the controller 110 reaches the end of the current frame or the controller 110 reaches the end of the second image. The controller 110 may copy the first and second image data starting after the first and second end points respectively. Thus, the current frame may start where the previous frame ended, and the two frames may be printed as one contiguous image with no breaks between the first and second images visible on the medium.

The controller 110 may copy third image data from a beginning of the first image as well. For example, the controller 110 may reach the end of the first image before it reaches the end of the current frame. The controller 110 may continue filling the current frame from the beginning of the first image until the current frame is full. If the controller 110 is filling the current frame by reading the first image left to right, the controller 110 may continue to fill the current frame starting from the left most column of the first image. Similarly, if the controller 110 reaches the end of the second image before it reaches the end of the current frame for the second image, the controller 110 may continue filling the current frame from the beginning of the second image. When filling a frame, the controller 110 may need to start again from the beginning of multiple images, from the beginning of only one image, from the beginning of multiple images multiple times, from none of the images, or the like.

After filling the current frame with image data, the controller 110 may send the current frame to an image engine 120. The image engine 120 may form an image corresponding to the current frame on the medium. The image engine 120 may include hardware or software and may include printheads, cylinders, or the like to form the image corresponding to the current frame on the medium. In one example, the image engine 120 may include inkjet printheads. The current frame may indicate to the image engine 120 how much of each color should be printed at each pixel of the current frame, and the image engine 120 may add ink to the medium accordingly.

Figure 2:
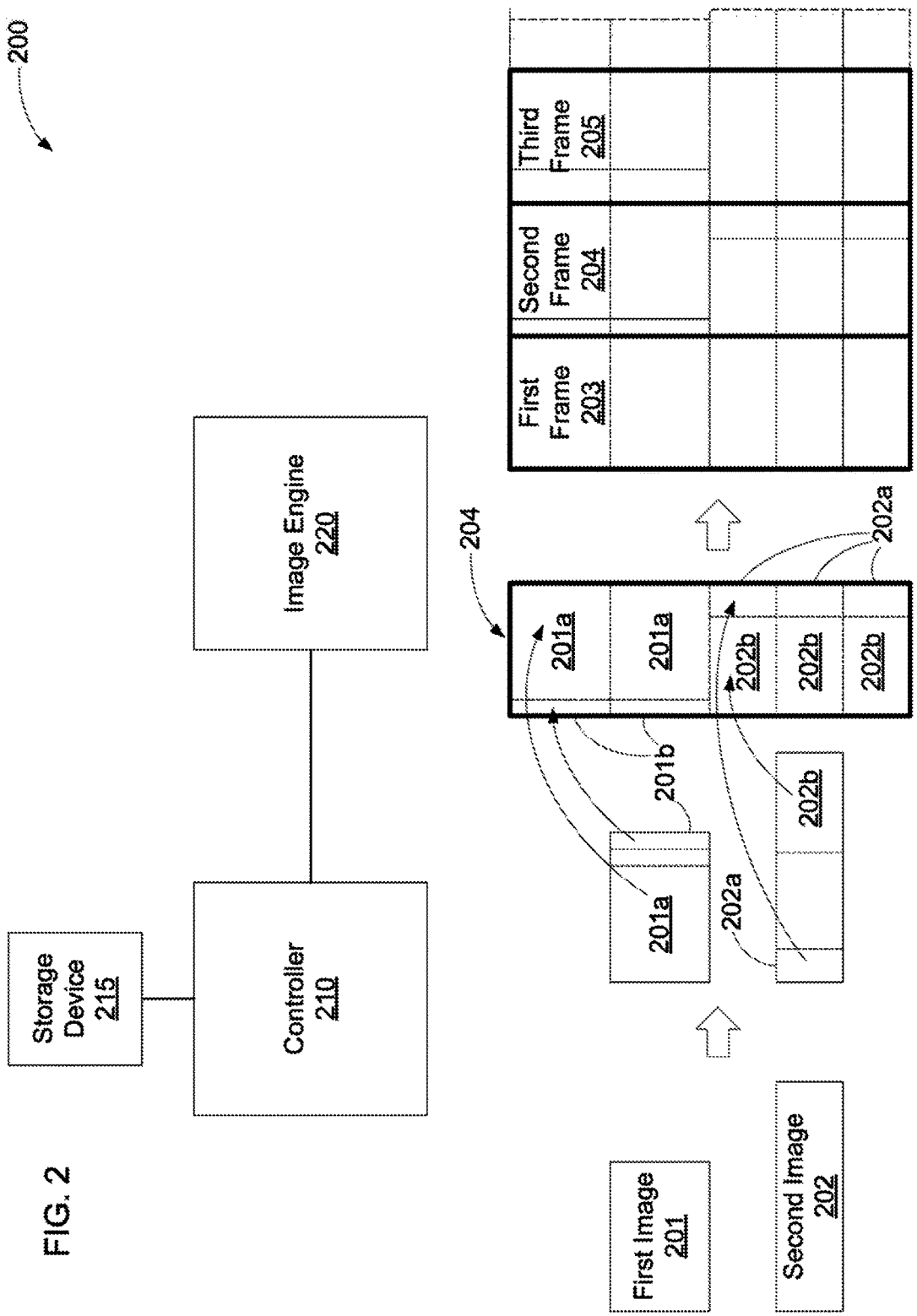
FIG. 2 is a block diagram of another example of a system to form a plurality of images on a medium.

FIG. 2 is a block diagram of another example of a system 200 to form a plurality of images on a medium. The system 200 may include a controller 210 and an image engine 220. The controller 210 may receive a first image 201 and a second image 202. In the illustrated example, the controller 210 is coupled to a storage device 215 (e.g., volatile or non-volatile memory) and may store copies of the first image 201 and the second image 202 in the storage device 215. In other examples, the first image 201 and the second image 202 may be stored in the controller 210 rather than in a separate storage device 215.

The controller 210 may create a plurality of frames 203, 204, 205 based on the stored first and second images 201, 202. In the illustrated example, there are two differently sized images 201, 202 and five ribbons formed from the two images 201, 202. In other example, there may be more or fewer differently sized images and more or fewer ribbons with any of a variety of different combinations of number of ribbons per image. The controller 210 may create each frame 203, 204, 205 by copying portions of the first and second images 201, 202 to the frames 203, 204, 205 from the copies of the first and second images 201, 202 stored in the storage device 215. For example, the controller 210 may copy first image data, second image data, third image data, etc. to the frames 203, 204, 205 from the stored copies of the first and second images 201, 202.

In the illustrated example, the creation of the second frame 204 is portrayed. The controller 210 may begin after the end point of the previous frame 203 and move left to right copying columns of the images 201, 202 into the current frame 204. The controller 210 may start copying from the beginning of each image 201, 202 (e.g., a left side) once it reaches the end of the image 201, 202. As a result, the controller 210 may copy a right portion 201b, 202b of each image 201, 202 to a left portion of a frame 204 and a left portion 201a, 202a of each image 201, 202 to a right portion of the frame 204. As used herein, the term "portion" refers to a part of an image or frame smaller than the whole. The terms "left portion" and "right portion" refer to the locations of the portions relative to each other but do not imply a size of the portions or an amount of the image or frame occupied by the portion. For example, the left portions 201a, 202a and the right portions 201b, 202b individually may not occupy the entire height of an image or frame, and portions of additional images may be included in the frame. There may be a gap between a left edge of an image or frame and a left portion, between a right edge of an image or frame and a right portion, or between the left and right portions. In the illustrated example, there are gaps between the left portions 201a, 202a and the right portions 201b, 202b that are not used in the creation of the second frame 204.

The length of the first image 201 may differ from the length of the second image 202. Moreover, the least common multiple of the lengths may be significantly greater than the first length and the second length (i.e., the least common multiple may be an integer multiple longer than the first length and an integer multiple longer than the second length). In some examples, the controller 210 may select the length of the frames 203, 204, 205 based on a length of the first image 201 or a length of the second image 202. For example, the length of the frames 203, 204, 205 may be half, equal to, twice, etc. the length of the first or second images 201, 202, which may reduce computation requirements to produce the frames 203, 204, 205.

In some examples, there may be an empty boundary region between adjacent images within a ribbon or between adjacent ribbons. The empty boundary region may be included in the images 201, 202 or may be added to the frames 203, 204, 205 separately. When the empty boundary region is added separately and falls on the edge of a frame, the controller 210 may determine how much of the boundary region to include in the current frame based on how much of the boundary region was included in the previous frame. The image engine 220 may be able to print frames back-to-back without any gap between the frames. In some examples, the controller 210 or the image engine 220 may overlap the edges of adjacent frames and apply an interleave mask to the overlapping portion of each frame. The overlapping and interleave mask may obscure the boundary between the frames from being visible by gradually blending the boundary without making the boundary region excessively dark.

Figure 3:
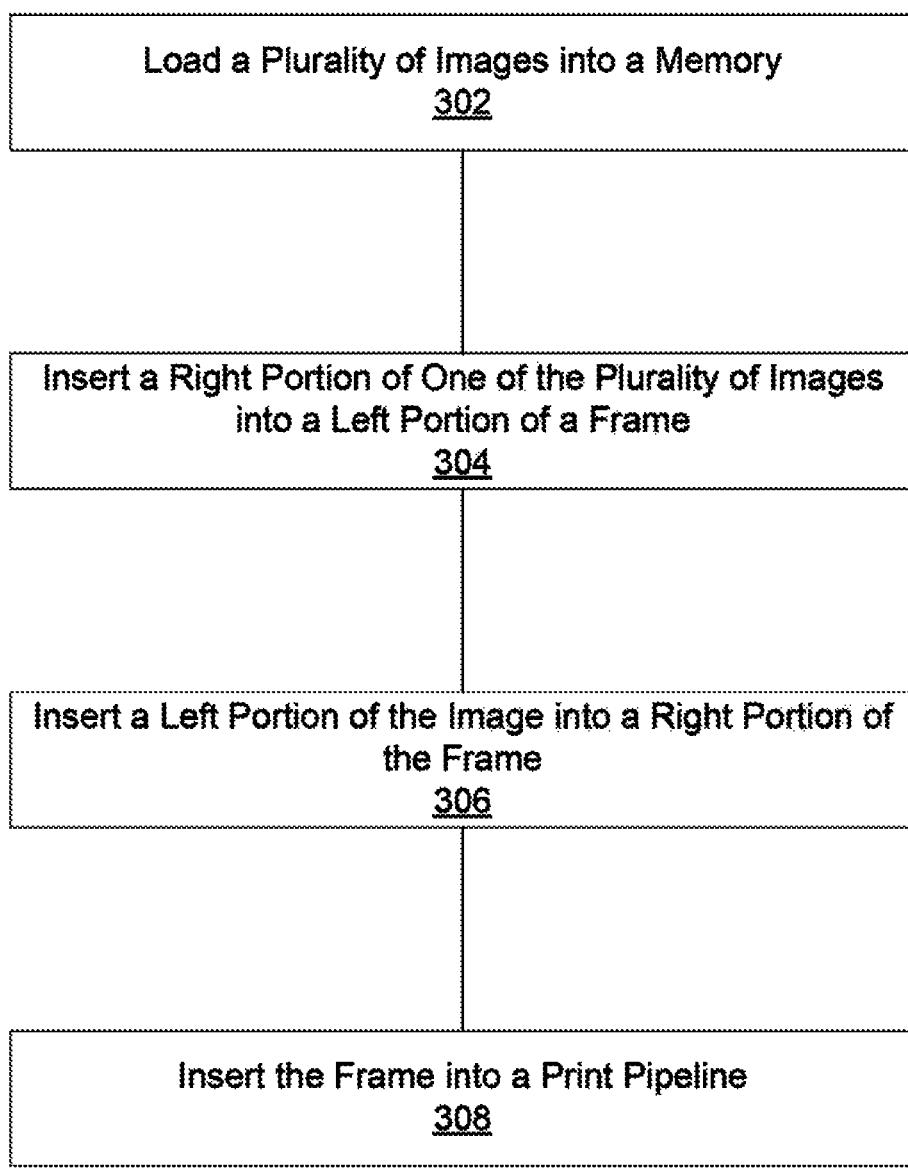
FIG. 3 is a flow diagram of an example method to create a frame to be printed on a medium.

FIG. 3 is a flow diagram of an example method 300 to create a frame to be printed on a medium. A processor may perform the method 300. At block 302, the method 300 may include loading a plurality of images into a memory. For example, loading the plurality of images into the memory may include storing the plurality of images in volatile or nonvolatile memory. Prior to being loaded into the memory, the plurality of images may be retrieved from persistent storage. Alternatively, the plurality of images may be received from another piece of hardware or software (e.g., a user application).

Block 304 may include inserting a right portion of one of the plurality of images into a left portion of a frame. For example, the end point of a previous frame may be determined. The portion of the image beginning after the end point may be inserted into the frame. The end point may be the last column from the image included in the previous frame, and the next column in the image may be the first column inserted into the current frame. For an image being inserted into the current frame by moving from left to right across the image, beginning after the end point of the previous frame may result in the right portion of the image being inserted into the current frame. If the image is being inserted by moving from left to right across the frame, the right portion of the image may be inserted into the left portion of the frame.

Block 306 may include inserting a left portion of the image into a right portion of the frame. At block 304, the right portion of the image may be inserted until the last column at the right end of the image is inserted, but the frame may still have room for more image data. Accordingly, inserting can restart at a beginning of the image (e.g., a left end of the image). For an image being inserted into the frame by moving from left to right across the image starting at the left end, the left portion of the image may be inserted into the frame. Because the left portion of the image may be inserted by continuing to move from left to right across the frame following the previous insertion, the left portion of the image may be inserted into the right portion of the frame. Thus, a right portion of the image may be in the left portion of the frame and a left portion of the image may be in the right portion of the frame. For a large frame size, there may be multiple entire images in the middle of the frame with a right portion of the frame nonetheless occupied by the left portion of the image and a left portion of the frame occupied by the right portion of the image. Portions from other images in the plurality of images may also be inserted into portions of the frame.

At block 308, the method 300 may include inserting the frame into a print pipeline. For example, once all the image data has been inserted into the frame, the frame may be provided to a next component to process the frame for printing. The frame may be transmitted to the next component, stored in a buffer or memory accessible to the next component, or the like. Referring to FIG. 2, the controller 210, for example, may perform blocks 302, 304, 306, and 308, and the image portions may be inserted into the frame as seen in FIG. 2.

Figure 4:
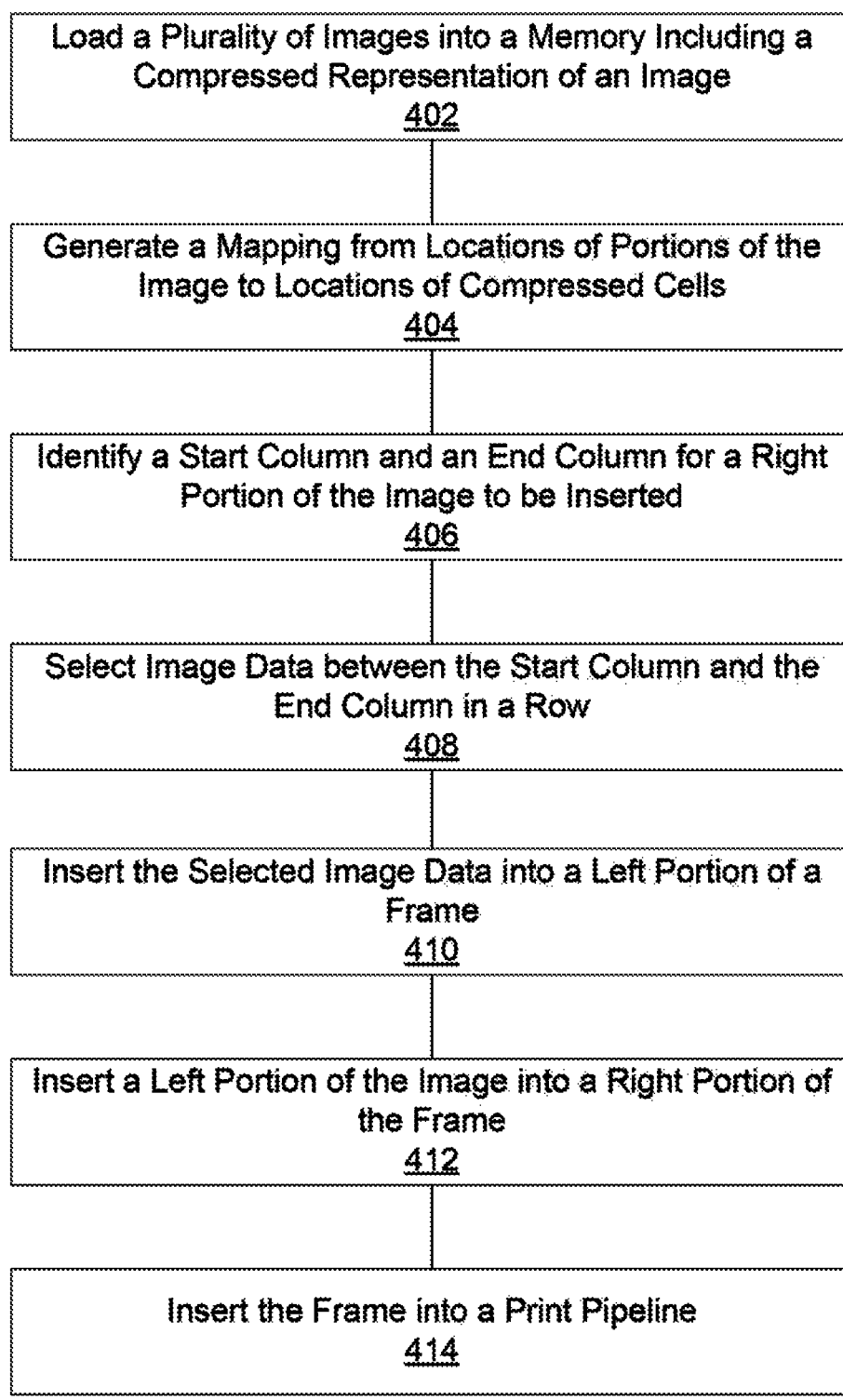
FIG. 4 is a flow diagram of another example method to create a frame to be printed on a medium.

FIG. 4 is a flow diagram of another example method to create a frame to be printed on a medium. At block 402, the method 400 may include loading a plurality of images into a memory including loading a compressed representation of one of the plurality of images. As used herein, the term "compressed representation" refers to data that can be uncompressed to produce image data. For example, the compressed representation may include a plurality of compressed cells corresponding to portions of the image (e.g., corresponding to a pixel, corresponding to a plurality of pixels, or the like). The compressed cells may all be the same size, or the sizes of the compressed cells may vary. For compressed cells of varying sizes, the locations of the cells within the compressed representation may not directly translate to the locations of the corresponding portions of the image.

Block 404 may include generating a mapping from locations of portions of the image to locations of corresponding compressed cells in the compressed representation. For example, the mapping may be a data structure (e.g., a lookup table, an associative array, a linked list, etc.) that associates the row and column of each portion of the image with a location of the corresponding compressed cell. The location of the compressed cells may be specified as a memory address, as an offset from a first compressed cell, as a row and column within the compressed representation, as a start location and an end location of the compressed cell, or the like. In examples with equally sized compressed cells, block 404 may be omitted from the method 400, and the locations of the compressed cells instead may be determined based on an equation or the like.

In some examples, the compressed cells may be uncompressed before the portions of the image are inserted into the frame or uncompressed and recompressed prior to insertion. Alternatively, computing power may be saved by inserting the compressed cells into the frame without uncompressing the cells. In an example, the image may be compressed row-by-row, and the compressed cells may be inserted into the frame row-by-row. At block 406, the method 400 may include identifying a start column and an end column for a right portion of the image to be inserted into the frame. For example, the start column may be selected as the first column after the end point in the image of the previous frame. The end column may be selected as the last column in the image, based on how many columns the frame can fit, or the like. In one example, the end column may be selected as the lesser of the start column plus the number of empty columns in the frame minus one (or the previous end point plus the number of empty columns) and the last column in the image.

Block 408 may include selecting the image data between the start column and the end column in each row to insert into the frame. The image data may be compressed cells, uncompressed image data, or the like. When the start and end columns are identified, they may be specified inclusively (i.e., the identified columns will be inserted into the frame), exclusively, (i.e., the identified columns will not be inserted into the frame), or a combination of inclusively and exclusively (i.e., one column will be inserted into the frame and one column will not). Accordingly, the data may be selected in a manner consistent with the identification of the start and end columns (i.e., the start and end columns may be included for inclusive, excluded for exclusive, etc.). Selecting the image data may include retrieving the image data from the memory. Selecting the image data may include determining the location of the image data based on the mapping (e.g., determining the locations of the start and end columns in the compressed representation).

Block 410 may include inserting the selected image data into a left portion of the frame. Compressed cells may be inserted into the frame. Alternatively, uncompressed image data, cells that have been uncompressed and recompressed, or the like may be inserted into the frame. If no image data has yet been inserted in the frame, the image data may be inserted starting at the beginning of the frame (e.g., a left most column of the frame). Accordingly, the right portion of the image may be inserted into the left portion of the frame. Blocks 408 and 410 may be repeated iteratively for each row or each compressed cell or performed at the same time until the entire right portion of the image has been inserted into the left portion of the frame. Alternatively, every row may be translated to locations in memory or all of the image data may be retrieved before inserting the image data into the frame.

At block 412, the method 400 may include inserting a left portion of the image into a right portion of the frame. For example, the left portion of the image may be inserted into the right portion of the frame in a manner similar to the insertion of the right portion of the image into the left portion of the frame. Like in blocks 406, 408, 410, the range to be inserted may be identified; the image data corresponding to the range may be selected from memory; and the selected image data may be inserted into the right portion of the frame. Block 414 may include inserting the frame into a print pipeline. For example, once the frame has been filled with the compressed cells, the frame may sent for further processing and eventual printing on the medium. In an example, the controller 210 of FIG. 2 may perform blocks 402, 404, 406, 408, 410, 412, and 414.

Figure 5:
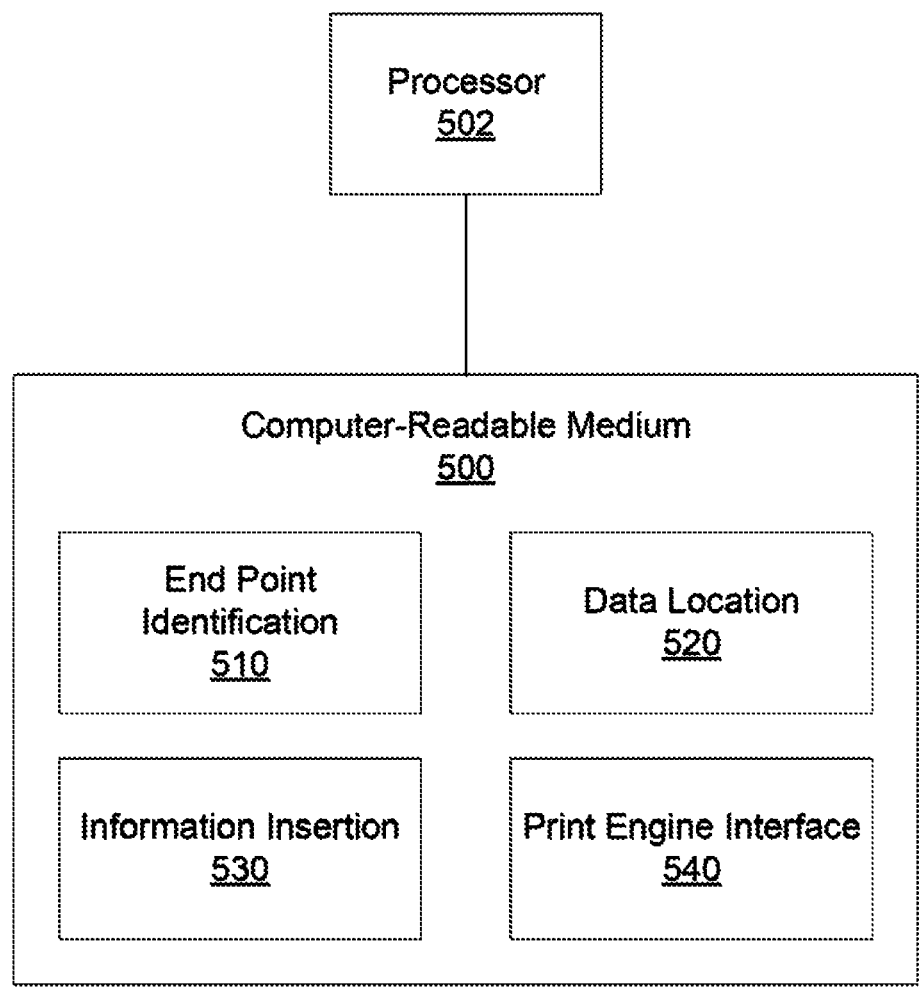
FIG. 5 is a block diagram of an example computer-readable medium containing instructions to create a frame to be printed on a medium.

FIG. 5 is a block diagram of an example computer-readable medium 500 containing instructions that, when executed by a processor 502, cause the processor 502 to create a frame to be printed on a medium. The computer-readable medium 500 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), and/or the like. The processor 502 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 500 may include an end point identification module 510. As used herein, a "module" (in some examples referred to as a "software modules") is a set of instructions that when executed or interpreted by a processor or stored at a processor-readable medium realizes a component or performs a method. The end point identification module 510 may include instructions that cause the processor 502 to identify an end point of a previous frame in an image. For example, the end point may be a last column included in the previous frame. The end point identification module 510 may cause the processor to identify the end point by retrieving a previously saved indication of the end point, by examining the last column of the previous frame, or the like.

The computer-readable medium 500 may include a data location module 520. The data location module 520 may include instructions that cause the processor 502 to determine a location corresponding to the end point in a compressed representation of the image (e.g., a location corresponding to a last column in the previous frame, a location correspond to a column following the last column, etc.). If the compressed representation of the image includes compressed cells with fixed sizes, the data location module 520 may cause the processor 502 to compute the location based on the sizes of the cells and the location of the end point in the image. Alternatively, the data location module 520 may cause the processor 502 to retrieve the location from a mapping, e.g., for compressed cells with variable sizes or for compressed cells with fixed sizes. The location may be a memory address, a memory offset, a row and column, or the like.

The computer-readable medium 500 may include an information insertion module 530. The information insertion module 530 may include instructions that cause the processor 502 to insert compressed information following the location corresponding to the end point into a current frame and to insert compressed information corresponding a beginning of the image into the current frame. The information insertion module 530 may cause the processor 502 to insert the compressed information following the end point into a beginning of a current frame. The information insertion module 530 may also cause the processor to insert the compressed information corresponding to the beginning of the image into the current frame following the compressed information following the end point. Accordingly, compressed information from the end of the image may be inserted into a beginning of the current frame and compressed information from the beginning of the image may be inserted into an end of the current frame.

The computer-readable medium 500 may include a print engine interface module 540 that includes instructions to cause the processor 502 to instruct a print engine to form an image corresponding to the current frame on a medium. In some examples, the print engine (not shown) may include an image engine to form an image on the medium and hardware or software to, inter alia, convert the compressed information to a format readable by the image engine to form the image on the medium. The print engine interface module 540 may cause the processor 502 to instruct an interface to communicate the current frame to the print engine and any information necessary for the print engine to process the current frame. Referring to FIG. 2, the end point identification module 510, the data location module 520, the information insertion module 530, or the print engine interface module 540, when executed by the processor 502, may realize a controller 210.

Figure 6:
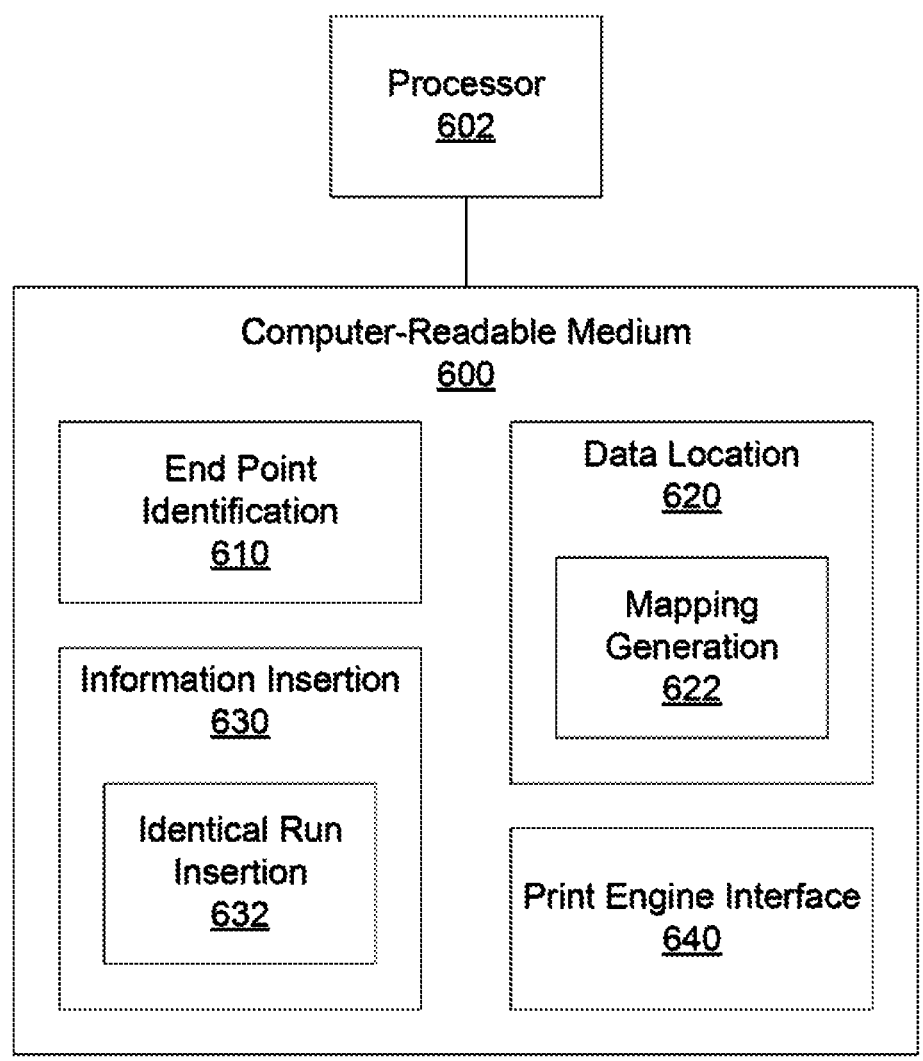
FIG. 6 is a block diagram of another example computer-readable medium containing instructions to create a frame to be printed on a medium.

FIG. 6 is a block diagram of another example computer-readable medium 600 containing instructions that, when executed by a processor 602, cause the processor 602 to create a frame to be printed on a medium. The computer-readable medium 600 may include an end point identification module 610 to cause the processor 602 to identify an end point of a previous frame in an image. For example, the end point identification module 610 may cause the processor 602 to determine the last column from the image included in the previous frame.

The computer-readable medium 600 may also include a data location module 620. The data location module 620 may cause the processor 602 to determine a location corresponding to the end point in a compressed representation of the image (e.g., a location corresponding to a last column in the previous frame, a location correspond to a column following the last column, etc.). The data location module 620 may include a mapping generation module 622. The mapping generation module 622 may cause the processor 602 initially to generate a mapping from locations of portions of the image to locations of corresponding compressed cells in the compressed representation of the image. The data location module 620 may then cause the processor 602 to determine the location corresponding to the end point based on the mapping. For example, the mapping may include a data structure (e.g., a lookup table, an associative array, a linked list, etc.) that relates locations in the image to locations in the compressed representation of the image.

The compressed representation of may include a single compressed cell to represent a plurality of identical portions of the image. For example, the compressed representation may include the single compressed cell and an indication of the number of times the cell is repeated in the uncompressed image. The mapping generation module 622 may cause the processor 602 to map the plurality of identical portions of the image to the single compressed cell. For example, the mapping may include a same location stored for each portion of the image in a run of identical portions, and the location may be that of the single compressed cell. Alternatively, or in addition, the mapping generation module 622 may cause the processor 602 to map all identical portion of the image to a same compressed cell regardless of whether the identical portions are in a run or not.

The computer-readable medium 600 may include an information insertion module 630 to cause the processor 602 to insert compressed information following the location corresponding to the end point into a current frame and to insert compressed information corresponding to a beginning of the image into the current frame. The information insertion module 630 may include an identical run insertion module 632. The identical run insertion module 632 may cause the processor 602 to insert a single compressed cell and an indication of the number of repetitions of the compressed cell into the current frame when an identical run is to be inserted into the current frame. For example, the identical run insertion module 632 may cause the processor 602 to compare each compressed cell to be inserted into the current frame with the compressed cell previous inserted into the current frame. The identical run insertion module 632 may cause the processor 602 to increment the indication of the number of repetitions based on the compressed cell to be inserted matching the previously inserted compressed cell. If the previously inserted compressed cell was not already in a run, the identical run insertion module 632 may cause the processor 602 to insert an indication that there are two identical compressed cells in the run. If the previously inserted compressed cell was already in a run, the identical run insertion module 632 may cause the processor 602 to update an already existing indication of the number of identical compressed cells in the run by incrementing it.

The computer-readable medium 600 may include a print engine interface module 640. The print engine interface module 640 may cause the processor 602 to instruct a print engine to form an image corresponding to the current frame on a medium. The print engine interface module 640 may cause the processor 602 to instruct an interface to communicate the compressed current frame to the print engine and any information necessary for the print engine to process the current frame. The interface may communicate with a print engine able to print gapless frames (i.e., back-to-back frames without visible spacing between the frames). Referring to FIG. 2, the end point identification module 610, the data location module 620, the mapping generation module 622, the information insertion module 630, the identical run insertion module 632, or the print engine interface module 640, when executed by the processor 602, may realize a controller 210.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A system comprising:
   a controller to:
   determine a first end point of a previous frame in a first image, the first image to be printed on a first ribbon,
   determine a second end point of the previous frame in a second image to be printed on a second ribbon, and
   create a current frame containing first image data from the first image starting after the first end point, second image data from the second image starting after the second end point, and third image data from a beginning of the first image; and
   an image engine to form an image corresponding to the current frame on a medium.

2. The system of claim 1, wherein the controller is to store a copy of the first image and a copy of the second image, and wherein the controller is to create the current frame by copying the first image data, the second image data, and the third image data from the copy of the first image and the copy of the second image.

3. The system of claim 1, wherein a first length of the first image differs from a second length of the second image, and wherein a least common multiple of the first length and the second length is significantly greater than the first length and the second length.

4. The system of claim 1, wherein the controller is to select a frame size based on a second length of the second image.

5. The system of claim 1, wherein the controller is to include an empty boundary in the current frame between the first image data and the third image data.

* * * * *